(12) United States Patent
Bachtiar et al.

(10) Patent No.: US 12,141,530 B2
(45) Date of Patent: Nov. 12, 2024

(54) DETERMINING UNKNOWN CONCEPTS FROM SURROUNDING CONTEXT

(71) Applicant: International Business Machines Corporation, Armonk, NY (US)

(72) Inventors: Maulana Bachtiar, Singapore (SG); Thi Thanh Thao Lai, Singapore (SG); Wen Rui Siow, Singapore (SG); Yida Lee, Singapore (SG); Ronny Syarif, Singapore (SG); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 17/342,601

(22) Filed: Jun. 9, 2021

(65) Prior Publication Data
US 2022/0398382 A1  Dec. 15, 2022

(51) Int. Cl.
*G06F 40/30* (2020.01)
*G06F 16/93* (2019.01)
(Continued)

(52) U.S. Cl.
CPC .............. *G06F 40/30* (2020.01); *G06F 16/93* (2019.01); *G06F 40/289* (2020.01); *G06N 5/048* (2013.01); *G06N 20/00* (2019.01)

(58) Field of Classification Search
CPC ........ G06F 40/30; G06F 16/93; G06F 40/289; G06N 5/048; G06N 20/00
See application file for complete search history.

(56) References Cited

U.S. PATENT DOCUMENTS 6,345,252 B1 * 2/2002 Beigi .................... G06F 16/685
704/E15.045
6,970,881 B1  11/2005 Mohan
(Continued)

FOREIGN PATENT DOCUMENTS

JP  6175413 B2  8/2017

OTHER PUBLICATIONS

"Linguistic Features", spaCy Usage Documentation, downloaded from the internet Apr. 7, 2021, 59 pages, <https://spacy.io/usage/linguistic-features#vectors-similarity>.
(Continued)

*Primary Examiner* — Bhavesh M Mehta
*Assistant Examiner* — Darioush Agahi
(74) *Attorney, Agent, or Firm* — Elliot J. Shine

(57) ABSTRACT

A computer-implemented method for learning unknown concepts during natural language processing is disclosed, including identifying a sentence associated with an unknown concept, selecting a first sequential set of sentences from a first document, including the sentence associated with the unknown concept, one sentence prior, and subsequent to the sentence associated with the unknown concept, selecting a second sequential set of sentences from a second document, including a sentence associated with a known concept, and one sentence prior and subsequent to the sentence associated with the known concept, comparing concepts associated with the first sequential set of sentences and second sequential set of sentences, determining whether an inference can be made between the unknown concept associated with the sentence from the first document and the sentence associated with the known concept associated with the sentence from the second document, and tagging the unknown concept associated with the known concept.

17 Claims, 6 Drawing Sheets

(51) Int. Cl.
*G06F 40/289* (2020.01)
*G06N 5/048* (2023.01)
*G06N 20/00* (2019.01)

(56) References Cited

U.S. PATENT DOCUMENTS

| | | | |
|---|---|---|---|
| 9,443,005 B2 | 9/2016 | Khandekar | |
| 10,929,612 B2 | 2/2021 | Jung | |
| 2006/0224584 A1* | 10/2006 | Price | G06F 16/313 |
| | | | 707/E17.084 |
| 2009/0077047 A1 | 3/2009 | Cooper | |
| 2009/0089326 A1* | 4/2009 | Balasubramanian | |
| | | | G06F 16/958 |
| 2014/0324812 A1 | 10/2014 | Cooper | |
| 2017/0011289 A1 | 1/2017 | Gao | |
| 2017/0177714 A1 | 6/2017 | Franceschini | |
| 2019/0073414 A1 | 3/2019 | Franceschini | |
| 2020/0104359 A1* | 4/2020 | Patel | G06F 16/313 |
| 2020/0185066 A1 | 6/2020 | Stevens | |
| 2021/0065042 A1* | 3/2021 | Gopalan | G06N 3/045 |
| 2021/0090557 A1* | 3/2021 | Park | G06F 40/40 |
| 2022/0030110 A1* | 1/2022 | Khafizov | H04M 3/2218 |

OTHER PUBLICATIONS

Babar, Nikhil, "The Levenshtein Distance Algorithm", DZone Big Data, Oct. 2, 2018, 6 pages, <https://dzone.com/articles/the-levenshtein-algorithm-1>.

Devlin et al., "Open Sourcing BERT: State-of-the-Art Pre-training for Natural Language Processing", Friday, Nov. 2, 2018, 3 pages, <https://ai.googleblog.com/2018/11/open-sourcing-bert-state-of-art-pre.html>.

Dua, Sumit, "Text Classification using K Nearest Neighbors", Nov. 12, 2018, 6 pages, <https://towardsdatascience.com/text-classification-using-k-nearest-neighbors-46fa8a77acc5>.

Jayaswal, Vaibhav, Text Vectorization: Term Frequency—Inverse Document Frequency (TFIDF), Oct. 4, 2020, 6 pages, <https://towardsdatascience.com/text-vectorization-term-frequency-inverse-document-frequency-tfidf-5a3f9604da6d>.

Mell et al., "The NIST Definition of Cloud Computing", Recommendations of the National Institute of Standards and Technology, NIST Special Publication 800-145, Sep. 2011, 7 pages.

Peirsman, Yves, "Comparing Sentence Similarity Methods", May 2, 2018, 10 pages, <http://nlp.town/blog/sentence-similarity/>.

Prabhakaran, Selva, Cosine Similarity—Understanding the math and how it works (with python codes), <https://www.machinelearningplus.com/nlp/cosine-similarity/>, downloaded from the internet on Apr. 7, 2021, 11 pages.

Rus et al., "Similarity Measures based on Latent Dirichlet Allocation", 12 pages, downloaded from the internet on Apr. 7, 2021, <http://www.cs.memphis.edu/~vrus/publications/2013/CICLing-2013.RusNiraulaBanjade.pdf>.

Uszkoreit, Jakob, "Transformer: A Novel Neural Network Architecture for Language Understanding", Thursday, Aug. 31, 2017, 3 pages, <https://ai.googleblog.com/2017/08/transformer-novel-neural-network.html>.

\* cited by examiner

DETERMINING UNKNOWN CONCEPTS FROM SURROUNDING CONTEXT

BACKGROUND

The present invention relates generally to the field of natural language processing, and more particularly to determining an unknown concept from the surrounding context.

Natural language processing (NLP) is a subfield of linguistics, computer science, and artificial intelligence for processing natural language data and determining the meaning of a word, sentence, or segment of natural language data. Natural language processing can use text classification in order to tag or categorize the text. Text classification is the process of assigning tags or categories to text according to its content. Text similarity calculates the similarity between sentences, paragraphs, and documents. To calculate the similarity between two items, the text is first converted into n-dimensional vectors which represents the text. The vector may contain keywords and entities in the document, or a representation of the topics expressed in the content. The similarity between the vectors can be compared and measured by cosine similarity.

Oftentimes, a document or sentence contains a word or concept that a natural language processor is unfamiliar with. When we encounter an unknown concept, we are typically able to infer the meaning of the unknown concept based on the context in which the unknown concept exists coupled with our current knowledge of particular concepts being present within particular contexts. However, this is not the case for a computer. When current natural processing systems encounter an unknown concept in the middle of a sentence or paragraph, this is akin to having a missing link within a chain of concepts. Whereas humans are typically able to infer meaning of an unknown concept by extrapolating known concepts, actions, and familiar contexts, embodiments of the present invention recognize that current natural language processing is unable to do the same.

Current Transformer models and the BERT Models of NLP make use of these ideas by looking at a pattern of word sequences and try to fix a missing a one. However, the learned concepts in BERT are word sequence patterns iteratively observed and generalized by a set of neural networks (NNs). In BERT the bi-directional sequence of words are used to provide additional "context". The same techniques are used to relate between two sentences too to provide appropriate answers.

Since current contextual-based methods only attempt to predict the missing part from a word sequence patterns, they cannot be effectively used for understanding concept coming from unknown sentences or paragraphs. Here, rather than performing language understanding using the word sequence patterns, embodiments of the present invention advantageously determine the pattern at one level above the sentences, which hosts a series of concepts seen in a cluster of sentences.

SUMMARY

According to one embodiment of the present invention, a computer-implemented method for learning unknown concepts during natural language processing is disclosed. The computer-implemented method includes identifying a sentence associated with an unknown concept from a first document. The computer-implemented method further includes selecting a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept. The computer-implemented method further includes selecting a second sequential set of sentences from a second document, wherein the second sequential set of sentences includes a sentence associated with a known concept, at least one sentence prior to the sentence associated with the known concept, and at least one sentence subsequent to the sentence associated with the known concept. The computer-implemented method further includes comparing concepts associated with the at least one sentence prior to and subsequent to the sentence associated with the unknown concept to concepts associated with at least one sentence prior to and subsequent to the sentence associated with the known concept, respectively. The computer-implemented method further includes determining, based on the comparison, whether an inference can be made between the unknown concept associated with the sentence from the first document and the sentence associated with the known concept associated with the sentence from the second document. The computer-implemented method further includes tagging, in response to determining that an inference can be made, the unknown concept associated with the sentence from the first document with the known concept associated with the sentence from the second document.

According to another embodiment of the present invention, a computer program product for learning unknown concepts during natural language processing is disclosed. The computer program product includes one or more computer readable storage media and program instructions stored on the one or more computer readable storage media. The program instructions include instructions to identify a sentence associated with an unknown concept from a first document. The program instructions further include instructions to select a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept. The program instructions further include instructions to select a second sequential set of sentences from a second document, wherein the second sequential set of sentences includes a sentence associated with a known concept, at least one sentence prior to the sentence associated with the known concept, and at least one sentence subsequent to the sentence associated with the known concept. The program instructions further include instructions to compare concepts associated with the at least one sentence prior to and subsequent to the sentence associated with the unknown concept to concepts associated with at least one sentence prior to and subsequent to the sentence associated with the known concept, respectively. The program instructions further include instructions to determine, based on the comparison, whether an inference can be made between the unknown concept associated with the sentence from the first document and the sentence associated with the known concept associated with the sentence from the second document. The program instructions further include instructions to tag, in response to determining that an inference can be made, the unknown concept associated with the sentence from the first document with the known concept associated with the sentence from the second document.

According to another embodiment of the present invention, a computer system for learning unknown concepts during natural language processing is disclosed. The computer system includes one or more computer processors, one or more computer readable storage media, computer program instructions, the computer program instructions being stored on the one or more computer readable storage media for execution by the one or more computer processors. The program instructions include instructions to identify a sentence associated with an unknown concept from a first document. The program instructions further include instructions to select a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept. The program instructions further include instructions to select a second sequential set of sentences from a second document, wherein the second sequential set of sentences includes a sentence associated with a known concept, at least one sentence prior to the sentence associated with the known concept, and at least one sentence subsequent to the sentence associated with the known concept. The program instructions further include instructions to compare concepts associated with the at least one sentence prior to and subsequent to the sentence associated with the unknown concept to concepts associated with at least one sentence prior to and subsequent to the sentence associated with the known concept, respectively. The program instructions further include instructions to determine, based on the comparison, whether an inference can be made between the unknown concept associated with the sentence from the first document and the sentence associated with the known concept associated with the sentence from the second document. The program instructions further include instructions to tag, in response to determining that an inference can be made, the unknown concept associated with the sentence from the first document with the known concept associated with the sentence from the second document.

The above listed embodiments of the present invention provide advantages to current known techniques by making an inference of a concept by comparing concepts associated with the at least one sentence prior to and subsequent to the sentence associated with the unknown concept to concepts associated with at least one sentence prior to and subsequent to the sentence associated with the known concept, respectively.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
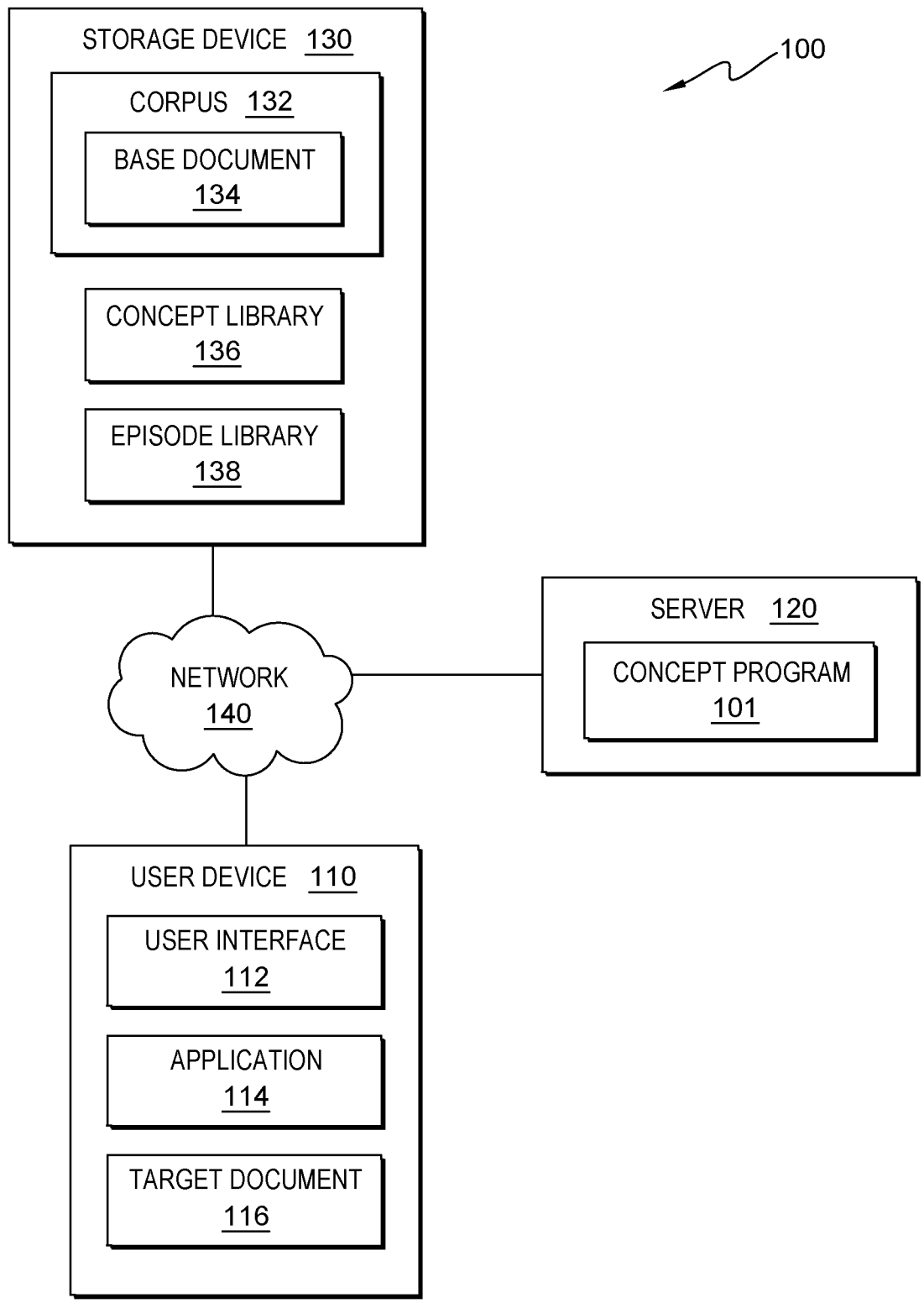
FIG. 1 is a block diagram of a system, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of natural language processing, but more particularly to determining unknown linguistic concepts.

Learning is incremental, especially when it comes to linguistic concepts. As human beings, we often infer meaning of an unknown concept by extrapolating known concepts, actions, and familiar text to the unknown concept. For example, an individual word or concept may be learned by images positioned with respect to an unknown word or concept. As another example, many words have strong associations with other words or concepts, such as "read" and "book", "coffee" and "mug", "sitting" and "chair," or "ice" and "cold." These associations are often based on related properties and their usage.

Sentences are nothing more than larger concepts or ideas using related and cohesive sub-concepts represented by individual words. Of course, concepts are controlled by words such as "with" "from" or "to" that connect two words or a string of words. The relationship between concepts and words helps us to understand unknown concepts by making inferences or otherwise "fill in the gaps" about the meaning of an unknown word or string of words. Very often, we as humans make assumptions about the meaning or concept represented by a word, group of words, or sentence based on what is understood about unknown words or concepts prior to and after the unknown words or concept. Similarly, we may make comparisons to a similar context that is understood in order to infer meaning to unknown concepts or words. For example, the following two passages may be understood by an individual:

(i) "I gave a good tip to the waiter. He was very happy and said 'thank you'. I felt good about it.";

(ii) "I saw an elderly woman carrying a heavy grocery bag to her car. I offered to carry the grocery bag to her car. She was tears and told me 'thank you'. I felt very happy too."

Based on our understanding of the above listed passages, we can then extrapolate the meanings of or connections that certain words (bolded in the previous passages) have with each other in order to infer the meaning of the unknown words italicized in the following passage:

(iii) I went to a Mexican restaurant and the food was delicious. I gave a generous tip to the server. He was smiling and said 'Gracias'. He was so happy that he even gave me a coupon for our next visit. I felt very self-satisfied."

Although the meaning of the words "Gracias" and "self-satisfied" may not readily be understood by an individual, based on the context in which these words exists and our understanding of certain interconnected concepts (e.g., "thankfulness" and "happiness"), we may be able to infer that the word "Gracias" is similar to "thank-you" and the word "self-satisfying" is similar to the word "happy."

Embodiments of the present invention recognize that current concept understanding systems are mostly rule or corpus based, which ultimately require initial or ongoing training. Based on an initial set of training, the system will then attempt to find similar strings based on a particular pattern. However, the systems knowledge is limited to the input data used for training. Thus, embodiments of the present invention recognize the need for current natural language processing systems, and concept understanding systems in general, to be able to determine the meaning of unknown concepts without the need for training or retraining. Furthermore, embodiments of the present invention recognize the need for a system that can automatically and rapidly recognize unidentifiable concepts at the sentence and paragraph level.

Embodiments of the invention improve upon the foregoing deficiencies of current natural language processing and concept understanding systems by inferring, and therefore self-learning the meaning of unknown concepts based on the surrounding context of an unknown concept itself. According to various embodiments of the present invention, a series of concepts including an unknown concept are compared to a similar chain of known concepts in a concept library or other document. The meaning of the unknown concept or word(s) is then inferred based on the surrounding context in which the unknown concept or word(s) is used. In other words, the meaning of the unknown concept is extrapolated using the information from the similar chain of known concepts. In an embodiment, similar known "scenes" or "combinations/sequences of contexts" are compared to a scene or combination/sequence of contexts surrounding an unknown concept in order to deduce or self learn the meaning of the unknown concept. A major advantage of this self-learning method is that the system can explain how it has come to identify a new concept based on identifying similar known concepts. Furthermore, unlike current Transformer and Bert models, which are limited to contexts at the sentence level to understand a single word, embodiments of the present invention provide for understanding unknown concepts at various different degrees of granularity, including on a word, sentence, or paragraph level.

In an embodiment, autonomous and incremental learning of unknown concepts is achieved by inferring the meaning of an unknown concept from similar known concepts. In an embodiment, contextual similarity is measured between textual segments or concept chains. In an embodiment, an unknown concept is determined from the context of the unknown concept by comparing the context of the unknown concept to other known neighboring concepts. The autonomous concept inferences can begin with neighboring sentences within the target document of the unknown concept and can be extended and iterated across other sentences in other documents and libraries. In an embodiment, the target document is the document containing the unknown concept. In an embodiment, the unknown concept is iteratively compared to known neighboring concepts in a base document by using a sliding window. In an embodiment, the base document is a document with known tagged concepts.

For example, the initial target document sliding window includes the sentence before the unknown concept and the sentence after the unknown concept in the target document, for a total of three sentences. Further, the initial base document sliding window includes the sentence before a potential known concept and the sentence after the potential known concept in the base document, for total of three sentences. Potentially, if there is a match between the sentence before the unknown concept and the sentence before the potential known concept and between the sentence after the unknown concept and the sentence after the potential known concept, the middle sentences should also contain the same concept. If after comparing the concept is still unknown, the sliding window of the target document is expanded to include two sentences before the unknown concept and two sentences after the unknown concept, to include five sentences total. Further, the sliding window of the base document is also expanded to include two sentences before the potential known concept and two sentences after the potential known concept, for a total of five sentences. The sliding windows are iteratively expanded until a concept match is found, a predetermined window size has been reached, and/or the end of the base document is reached. At this point, a different base document or library having a similar topic or theme as the target document is selected, the sliding window size is reduced to an initial window size, and this iterative comparative process is repeated with the newly selected base document or library.

Accordingly, embodiments of the present invention may include one, or more, of the following features, characteristics, and/or advantages: matching contexts around unknown word(s), sentences, and/or paragraphs to infer the meaning of an unknown word, sentence, and/or paragraph without requiring an initial training phase re-training and performing autonomous and incremental self-learning of unknown concepts by inferring the meaning of an unknown concept from similarly matched known concepts.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment, generally designated 100, for determining the concept of an unknown segment in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 may include components, as depicted and described in further detail with respect to FIG. 4, in accordance with embodiments of the present invention.

User device 110 further includes user interface 112, application 114, and target document 116. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays the input document.

Application 114 can be representative of one or more applications (e.g., an application suite) that operate on user device 110. In various example embodiments, application 114 can be an application that a user of user device 110 utilizes to view target document 116 via user interface 112. Target document 116 can be any document with text. In other embodiments, application 114 can be another mobile device application (e.g., a web browser, enterprise-specific messaging application, social media application, etc.). For example, application 114 is a client-side application associated with server 120 (e.g., a client-side application associated with concept program 101).

In an additional embodiment, application 114 can operate to perform processing steps of concept program 101 (i.e., application 114 can be representative of concept program 101 operating on user device 110), in accordance with various embodiments of the present invention. For example, a user of user device 110 can create, input, or upload target document 116 via application 114.

Server 120 can be a standalone computing device, management server, a web server, a mobile computing device, or any other electronic computing system capable of receiving, sending, and processing data. In another embodiment, server 120 can be a laptop computer, a tablet computer, a notebook computer, a personal computer, a desktop computer, or any programmable electronic device capable of communicating with other computing devices within computing network 140 via a network, such as network 140. In general, server 120 is representative of any electronic device or combination of electronic devices capable of executing computer readable program instructions.

In another embodiment, server 120 represents a computing system utilizing clustered computers and components (e.g., database server computers, application server computers, etc.) that can act as a single pool of seamless resources when accessed within event driven smart device control environment 100. Server 120 includes concept program 101. Server 120 can include internal and external hardware components, as depicted and described in further detail with respect to FIG. 5.

Storage device 130 includes corpus 132, base document 134, concept library 136, and episode library 138. Corpus 132 contains information on a collection of learnt concepts. For example, corpus 132 contains information on the identified concepts in base document 134. Base document 134 is a document or collection of known concepts. In an embodiment, corpus 132 contains information on episode libraries, or combination of sequence of context. In an embodiment, concept program 101 accesses corpus 132 to search for learnt concepts.

In an embodiment, concept library 136 is a curated collection of sentences organized by concept. In an embodiment, concepts within the concept library are broken up by words, sentences, paragraphs, or phrases. Concept libraries contain concepts and their chain, or subtopics. A series of concepts form an episode. In an embodiment, episode library 138 is a curated collection of sequences of tagged sentences with known concepts. In an embodiment, episode library 138 is a combination of sequence of context.

In an embodiment, standard natural language processor techniques, such as transformers, are used to understand the sequence of sentences and associated concepts in multiple documents. From this, the present invention is able to collect a sequence of patterns which form an incrementally updated library of concepts and associated sequences of concepts. Embodiments of the present invention generate themes or topics for the document representing a narrow domain such as "gardening" "cooking" or "programming." The concepts within each theme will have a coherent sequence and connections. Embodiments of the present invention identify the overall theme of a new input document based on the known concepts and their sequences. Embodiments of the present invention use similarity analysis of the collection and order of the concepts understood from the new input document and "themes" and patterns of concepts in the library. Embodiments of the present invention identify an unknown word or sentence as $S_n$ and identifies $S_{n-1}$ as the sentence prior to the unknown sentence and $S_{n+1}$ as the sentence following to the unknown. The set of Sn, $S_{n+1}$ are compared and matched with patterns of similar themes that cover $S_{n-1}$ and $S_{n+1}$ to determine whether there is a matching themes. For example, embodiments of the present invention identify three sentences in another document, $B_n$, $B_{n-1}$, and $B_{n+1}$ and compare these three sentences to $S_n$, $S_{n-1}$, and $S_{n+1}$. Embodiments of the present invention determine if the concept of $B_{n-1}$ match $S_{n-1}$ and if the concept of $B_{n+1}$ matches $B_{n+1}$ If a concept match is found, embodiments of the present invention infer the concept of $S_n$ is similar or the same to $B_n$. Embodiments of the present invention determine a certainty level depending on the extent of the match.

If a concept match is not found between $B_{n-1}$ and $S_{n-1}$ and $S_{n+1}$ and $B_{n+1}$, embodiments of the present invention expand the window to include two sentences prior to the unknown segments and two sentences proceeding the unknown segment, $S_{n-2}$, $S_{n-1}$, $S_n$, $S_{n+1}$, $S_{n+2}$ and $B_{n-2}$, $B_{n-1}$, $B_n$, $B_{n+1}$, $B_{n+2}$. Embodiments of the present invention repeat the steps of identifying matching themes and expanding the window to infer a concept until a match is found. Embodiments of the present invention repeat the steps until the end of the document or a predetermined window size.

In an embodiment, concept program 101 receives an input document, such as target document 116. In an embodiment, concept program 101 generates themes or topics for the document representing a narrow domain. In an embodiment, concept program 101 determines an unknown concept. In an embodiment, concept program 101 selects a first sequence of sentences including the sentence with the unknown concept. In an embodiment, concept program 101 selects a first sequence of sentences based on a trio with a window size of three, with the middle sentence containing the unknown concept. In an embodiment, concept program 101 selects a first sequence of sentences including the sentence directly before and directly after the sentence containing the unknown concept. In an embodiment, concept program 101 identifies the unknown sentence as $S_n$, $S_{n-1}$ as the sentence directly prior to the unknown concept sentence, and $S_{n+1}$ as the sentence directly following to the unknown concept sentence. In this embodiment, the window size is three comprising the set of $S_n$, $S_{n-1}$, $S_{n+1}$.

In an embodiment, concept program 101 determines if a second sequence set matches the first sequence set. In an embodiment, concept program 101 identifies three sentences in another document, $B_n$, $B_{n-1}$, and $B_{n+1}$ and compare these three sentences to $S_n$, $S_{n-1}$, and In an embodiment, concept program 101 compares the concepts of $B_{n-1}$ to $S_{n-1}$ and $B_{n+1}$ to $S_{n+1}$ to determine if there is a match. For example, if the document is determined to have a theme or topic of a service contract and the concept of $S_{n-1}$ is determined to be about termination, $S_{n+1}$ is about delivery, $B_{n-1}$ is about termination, $B_{n+1}$ is about delivery, and $B_n$ is about payment, concept program 101 will detect a match between $S_{n-1}$ and $B_{n-1}$ and $S_{n+1}$ and $B_{n+1}$ If a match is found, concept program 101 infers the concept of $S_n$ is similar or the same to $B_n$. In this example, concept program 101 infers $S_n$ has the same concept as $B_n$, payment.

In an embodiment, concept program 101 determines a certainty level or a degree of similarity. In an embodiment concept program 101 determines a match is detected if the degree of similarity is above a predetermined threshold. In an embodiment the degree of similarity is dependent on the extent of the match. In an embodiment the degree of similarity is based on an average of a first degree of similarity determined for the comparison of $S_{n-1}$ and $B_{n-1}$ and a second degree of similarity is determined for the comparison of $S_{n+1}$ and $B_{n+1}$ For example, if the first degree of similarity for $S_{n-1}$ and $B_{n-1}$ is 75 and the second degree of similarity for $S_{n+1}$ and $B_{n+1}$ is 85, the average degree of similarity is 80. In this example, if the predetermined threshold to determine a match is 70, concept program 101 will determine there is a concept match.

In an embodiment, the degree of similarity is based on the total degree of similarity. For example, if the first degree of similarity for $S_{n-1}$ and $B_{n-1}$ is 50 and the second degree of similarity for $S_{n+1}$ and $B_{n+1}$ is 70, the total degree of similarity is 120. In this example, if the predetermined threshold to determine a match is 130, concept program 101 will determine there is not a concept match.

In an embodiment, if a concept match is not found between $B_{n-1}$ and $S_{n-1}$ and $B_{n+1}$ and $S_{n+1}$, concept program 101 determines a third sequence set. In an embodiment, if a concept match is not found between $B_{n-1}$ and $S_{n-1}$ and $B_{n+1}$ and $S_{n+1}$, concept program 101 determines a third sequence set by expanding the window to include two sentences prior to the unknown segments and two sentences proceeding the unknown segment comprising, $S_{n-2}$, $S_n$, $S_{n+1}$, $S_{n+2}$. In an embodiment, concept program 101 determines a fourth sequence set to be $B_{n-2}$, $B_{n-1}$, $B_n$, $B_{n+1}$, $B_{n+2}$ In these embodiments, the window size is five. In an embodiment, concept program 101 compares the concepts of $B_{n-2}$ to $S_{n-2}$ and $B_{n+2}$ to $S_{n+2}$ to determine if there is a match.

Once a match is detected, the concept associated with the unknown word, sentence, or paragraph is tagged, categorized, and added to a concept library 136. In an embodiment, concept library 136 is a curated collection of sentences organized by concept. In an embodiment, concepts within the concept library are broken up by words, sentences, paragraphs, or phrases. In an embodiment, concept library 136 is organized by the concept tag. For example, a concept tag "gratitude" will encompass phrases of gratitude such as "thank you" "I appreciate it" and "gracias". In an embodiment, concept program 101 tags and adds the identified concept and its certainty level in concept library 136.

In an embodiment, concept program 101 compares a shared concept associated with sentences $S_{n-2}$ and $S_{n-1}$ with a shared concept associated with sentences $B_{f-2}$ and $B_{f-1}$ and compares a shared concept associated with sentences $S_{n+2}$ and $S_{n+1}$ with a shared concept associated with sentences $B_{f+2}$ and $B_{f+1}$. In an embodiment, concept program 101 compares a distinct concept associated with each selected sentence surrounding the unknown concept of the target document with each selected of the surrounding the known concept of the base document. For example, concept program 101 compares the concept of sentence $S_{n-2}$ with the concept of sentence $B_{f-2}$, the concept of sentence $S_{n-1}$ with the concept of sentence $B_{f-1}$, the concept of $S_{n+1}$ with the concept of sentence $B_{f+1}$, and the concept of $S_{n+2}$ with the concept of sentence $B_{f+2}$. For example, if $S_{n-2}$ states, "I like flying" and if $S_{n-1}$ states "However, I hate the turbulence while flying" the shared concepts can be determined to be "flying" and "enjoyment."

Embodiments of the present invention repeat the steps of identifying matching themes and expanding the window to infer a concept until a match is found. Embodiments of the present invention repeat the steps until the end of the document or a predetermined window size. In an embodiment, the predetermined window size is determined by user selection. In an embodiment, concept program 101 repeats the steps of identifying matching themes and expanding the window to infer concepts in one or more documents. In an embodiment, concept program 101 repeats the steps of identifying matching themes with documents with similar themes to target document 116.

Figure 2A:
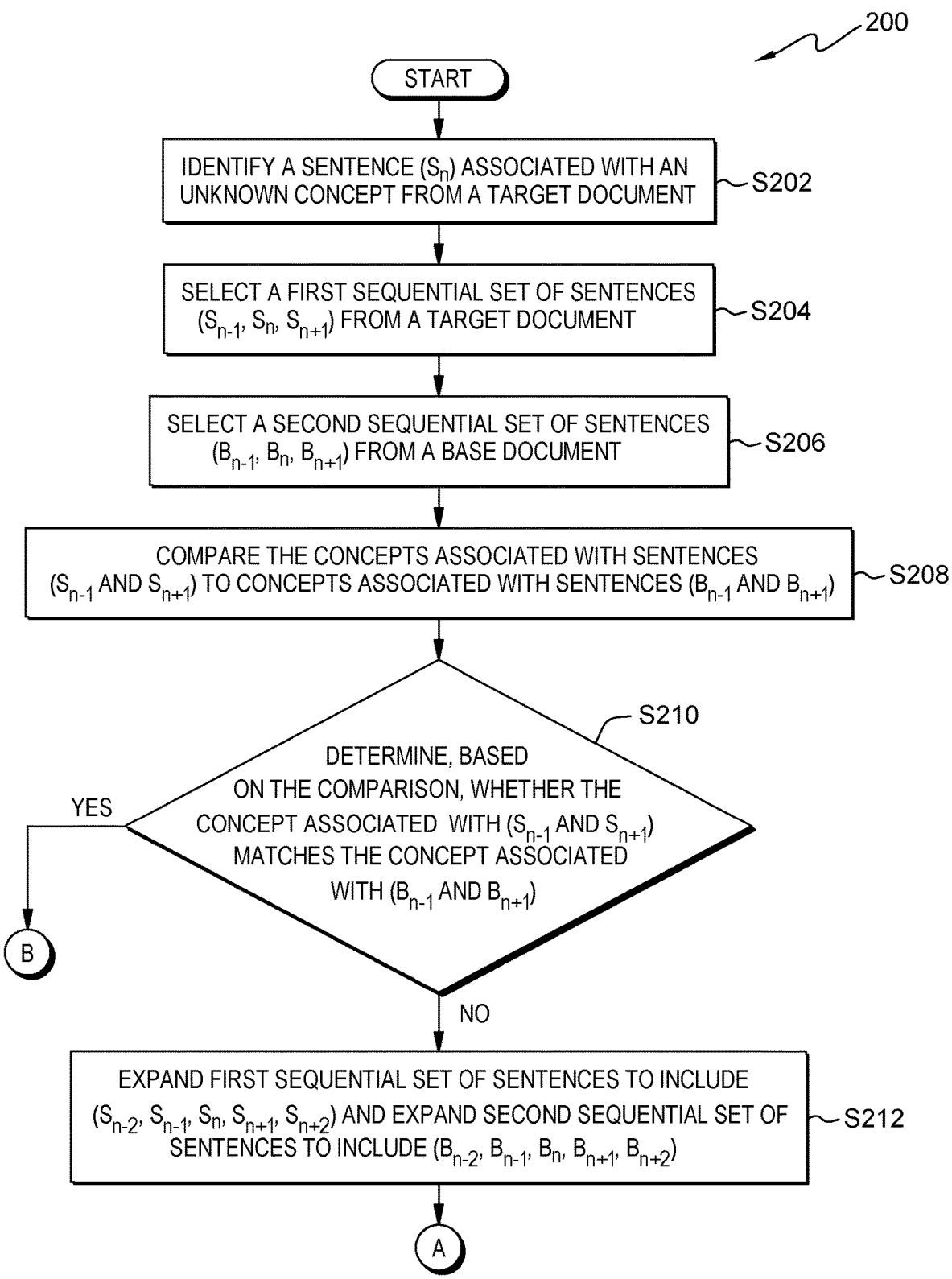
FIGS. 2A and 2B are a flow chart diagram depicting operational steps for determining an unknown concept from the surrounding context, generally designated 200, in accordance with at least one embodiment of the present invention.
Figure 2B:
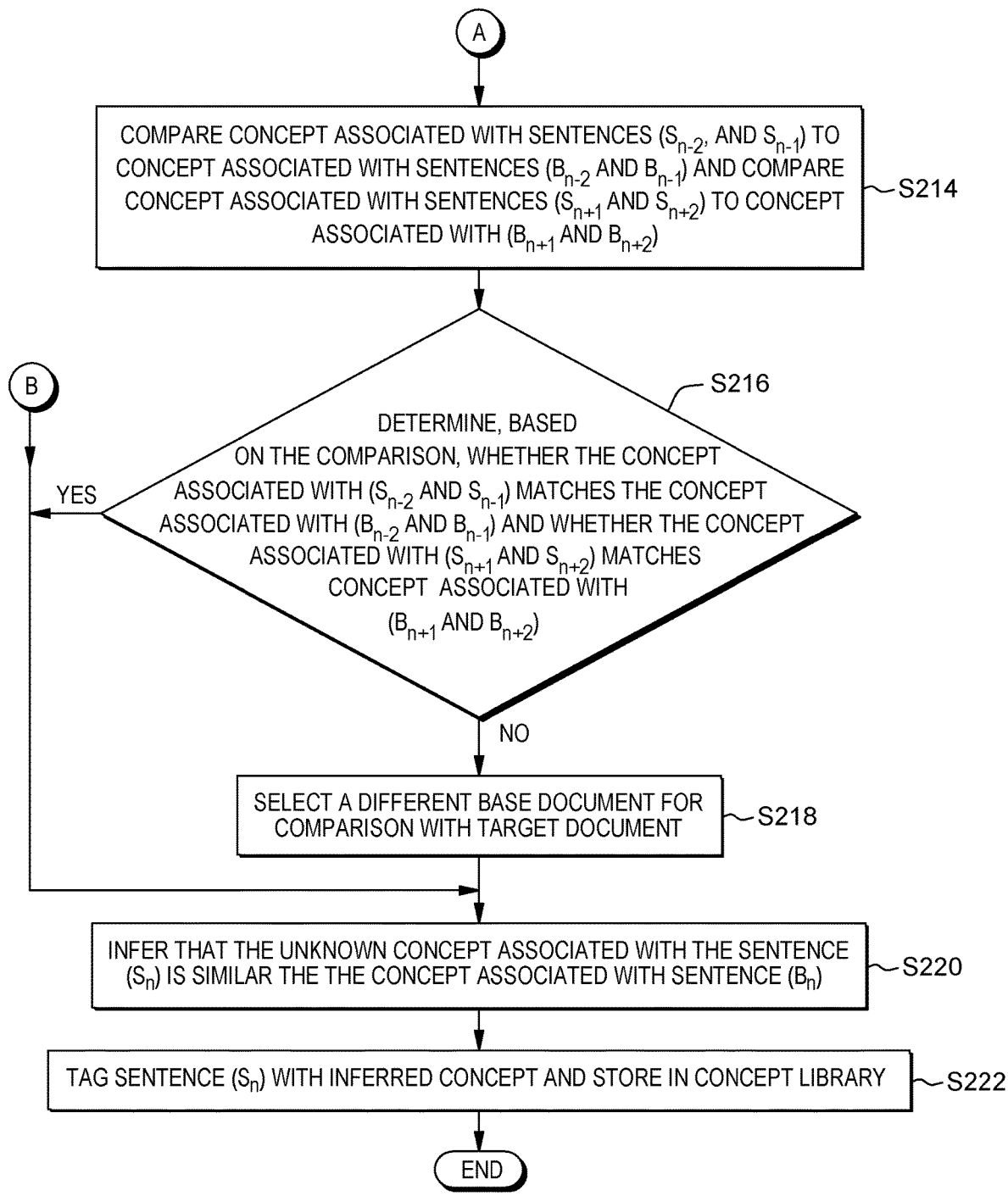

FIGS. 2A and 2B are a flow chart diagram depicting operational steps for determining an unknown concept from the surrounding context, generally designated 200, in accordance with at least one embodiment of the present invention. FIGS. 2A and 2B provide only an illustration of one implementation and does not imply any limitations with regard to the environments in which different embodiments may be implemented. Many modifications to the depicted environment may be made by those skilled in the art without departing from the scope of the invention as recited by the claims.

At step S202, concept program 101 identifies a sentence, $S_n$, associated with an unknown concept from a target document. In an embodiment, the target document is a document uploaded or created by the user.

At step S204, concept program 101 selects a first sequential set of sentences, $S_n$, $S_{n-1}$, and $S_{n+1}$, from the target document. In an embodiment, the first sequential set of sentences contains the sentence before the sentence associated with an unknown concept and the sentence after the sentence associated with an unknown concept.

At step S206, concept program 101 selects a second sequential set of sentences, $B_f$, $B_{f-1}$, and $B_{f+1}$, from a base document. In an embodiment, the second sequential set of sentences contains the sentence before the sentence associated with a known concept and the sentence after the sentence associated with a known concept.

At step S208, concept program 101 compares the concepts associated with sentences $S_{n-1}$, and $S_{n+1}$ to concepts associated with sentences $B_{f-1}$, and $B_{f+1}$. In an embodiment, concept program 101 compares the concept of sentence $S_{n-1}$ with the concept of sentence $B_{f-1}$. In an embodiment, concept program 101 compares the concept of sentence $S_{n+1}$ with the concept of sentence $B_{f+1}$.

At decision step S210, concept program 101 determines, based on the comparison, whether the concept associated with $S_{n-1}$, and $S_{n+1}$ matches the concept associated with sentences $B_{f-1}$, and $B_{f+1}$. If it is determined that the concept associated with $S_{n-1}$, and $S_{n+1}$ does not match the concept associated with sentences $B_{f-1}$, and $B_{f+1}$ (decision step S210 "NO" branch), concept program 101 proceeds to step S212. If it is determined that the concept associated with $S_{n-1}$, and $S_{n+1}$ matches the concept associated with sentences $B_{f-1}$, and $B_{f+1}$ (decision step S210 "YES" branch), concept program 101 proceeds to step S220.

In an embodiment, a match is determined if a degree of similarity between a concept associated with two sentences that are compared (e.g., $S_{n-1}$ and $B_{f-1}$) is above a predetermined threshold. In an embodiment, a match is not determined if a degree of similarity between a concept associated with two sentences that are compared (e.g., $S_{n+1}$ and $B_{f+1}$) is below a predetermined threshold.

At step S212, concept program 101 expands the first sequential set of sentences to include $S_{n-2}$, $S_{n-1}$, $S_n$, $S_{n+1}$, $S_{n+2}$ and expands the second sequential set of sentences to include $B_{f-2}$, $B_{f-1}$, $B_f$, $B_{f+1}$, $B_{f+2}$. In an embodiment, the expanded first sequential set of sentences contains two sentences before the sentence associated with an unknown concept and two sentences after the sentence associated with an unknown concept. In an embodiment, the second sequential set of sentences contains two sentences before the sentence associated with a known concept and two sentences after the sentence associated with a known concept.

At step S214, concept program 101 compares a shared concept associated with sentences $S_{n-2}$ and $S_{n-1}$ with a shared concept associated with sentences $B_{f-2}$ and $B_{f-1}$ and compares a shared concept associated with sentences $S_{n+2}$ and $S_{n+1}$ with a shared concept associated with sentences $B_{f+2}$ and $B_{f+1}$. In an embodiment, concept program 101 compares a distinct concept associated with each selected sentence surrounding the unknown concept of the target document with each selected sentence surrounding the known concept of the base document. For example, concept program 101 compares the concept of sentence $S_{n-2}$ with the concept of sentence $B_{f-2}$, the concept of sentence $S_{n-1}$ with the concept of sentence $B_{f-1}$, the concept of $S_{n+1}$ with the concept of sentence $B_{f+1}$, and the concept of $S_{n+2}$ with the concept of sentence $B_{f+2}$.

At decision step S216, concept program 101 determines, based on the comparison, whether the concept associated with $S_{n-2}$ and $S_{n-1}$ matches the concept associated with $B_{f-2}$ and $B_{n-1}$ and whether of the concept associated with $S_{n+1}$ and $S_{n+2}$ matches concepts associated with $B_{n+1}$ and $B_{n+2}$. If it is determined that the concept associated with either $S_{n-2}$ and $S_{n-1}$ does not match the concept associated with $B_{f-2}$ and with $B_{f-1}$ or the concept associated with either $S_{n+1}$ and $S_{n+2}$ does not match the concepts associated with $B_{n+1}$ and $B_{n+2}$ (decision step S216 "NO" branch), concept program 101 proceeds to step S218. If it is determined that the concept associated with $S_{n-1}$, and $S_{n+1}$ matches the concept associated with sentences $B_{n-1}$, and $B_{n+1}$ (decision step S216 "YES" branch), concept program 101 proceeds to step S220.

In an embodiment, a match is determined if a degree of similarity between a concept associated with two sentences that are compared (e.g., $S_{n-2}$ and $B_{f-2}$) is above a predetermined threshold. In an embodiment, a match is not determined if a degree of similarity between a concept associated with two sentences that are compared (e.g., $S_{n-2}$ and $B_{f-1}$) is below a predetermined threshold. In an alternative embodiment, a match is determined if a degree of similarity between a concept associated with two sentences prior to (e.g., $S_{n-2}$, $S_{n-1}$) or after ($S_{n+2}$, $S_{n-1}$) the sentence associated with unknown concept are compared to a concept associated with two sentences prior to (e.g., $B_{n-2}$, $B_{n-1}$) or after ($B_{n+2}$, $B_{n+1}$) is above a predetermined threshold. In an alternative embodiment, a match is determined if an average degree of similarity between each concept associated with two sentences prior to (e.g., $S_{n-2}$, $S_{n-1}$) or after ($S_{n+2}$, $S_{n-1}$) in the first set of sequential sentences and each concept associated with two sentences prior to (e.g., $B_{n-2}$, $B_{n-1}$) or after ($B_{n+2}$, $B_{n+1}$) in the second set of sequential sentences is above a predetermined threshold.

At step S218, concept program 101 selects a different base document for comparison with the target document. In an embodiment, the different base document has the same topic or theme as the target document. In an embodiment, a different base document is selected if match has yet to be determined and a number of sequential set of sentences in a set of sequential sentences are expanded such that the end of the base document is reached. In an embodiment, a different base document is selected if a match is not determined after a threshold number of sequential sentences within a set of sequential sentences has been reached.

In an embodiment, concept program 101 iterates the steps of FIGS. 2A and 2B with the newly selected different base document in order to determine the unknown concept associated with the target document. Accordingly, the number of sentences included in the first and second sequential sets of sentences is reduced to an initial window size. For example, the number of sentences included in the first sequential set of sentences from the target document may be reduced to the sentence before and after the sentence associated with the unknown concept. Similarly, the number of sentences included in the second sequential set of sentences from the newly selected base document may be reduced to the sentence before and after the sentence associated with the known concept.

At step S220, concept program 101 infers that the unknown concept associated with the sentence $S_n$ in the target document is similar to the concept associated with the sentence $B_f$ in the base document.

At step S222, concept program 101 tags sentence $S_n$ with the inferred concept and stores the tagged sentence in a concept library.

Figure 3:
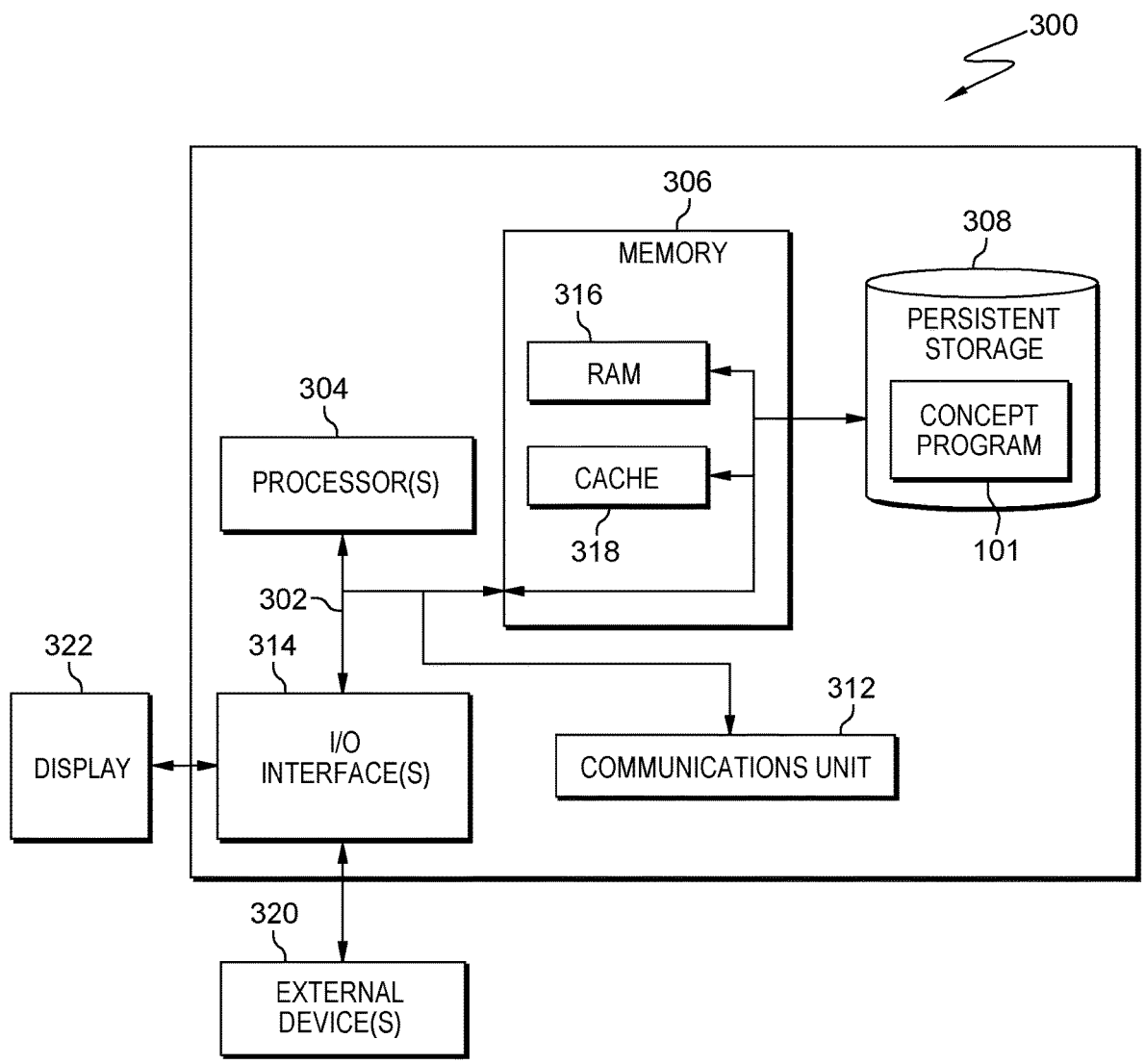
FIG. 3 is a block diagram depicting components of a computer, generally designated 300, suitable for executing a concept program 101 in accordance with at least one embodiment of the present invention.

FIG. 3 is a block diagram depicting components of a computing device, generally designated 300, suitable for concept program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes concept program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for concept program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
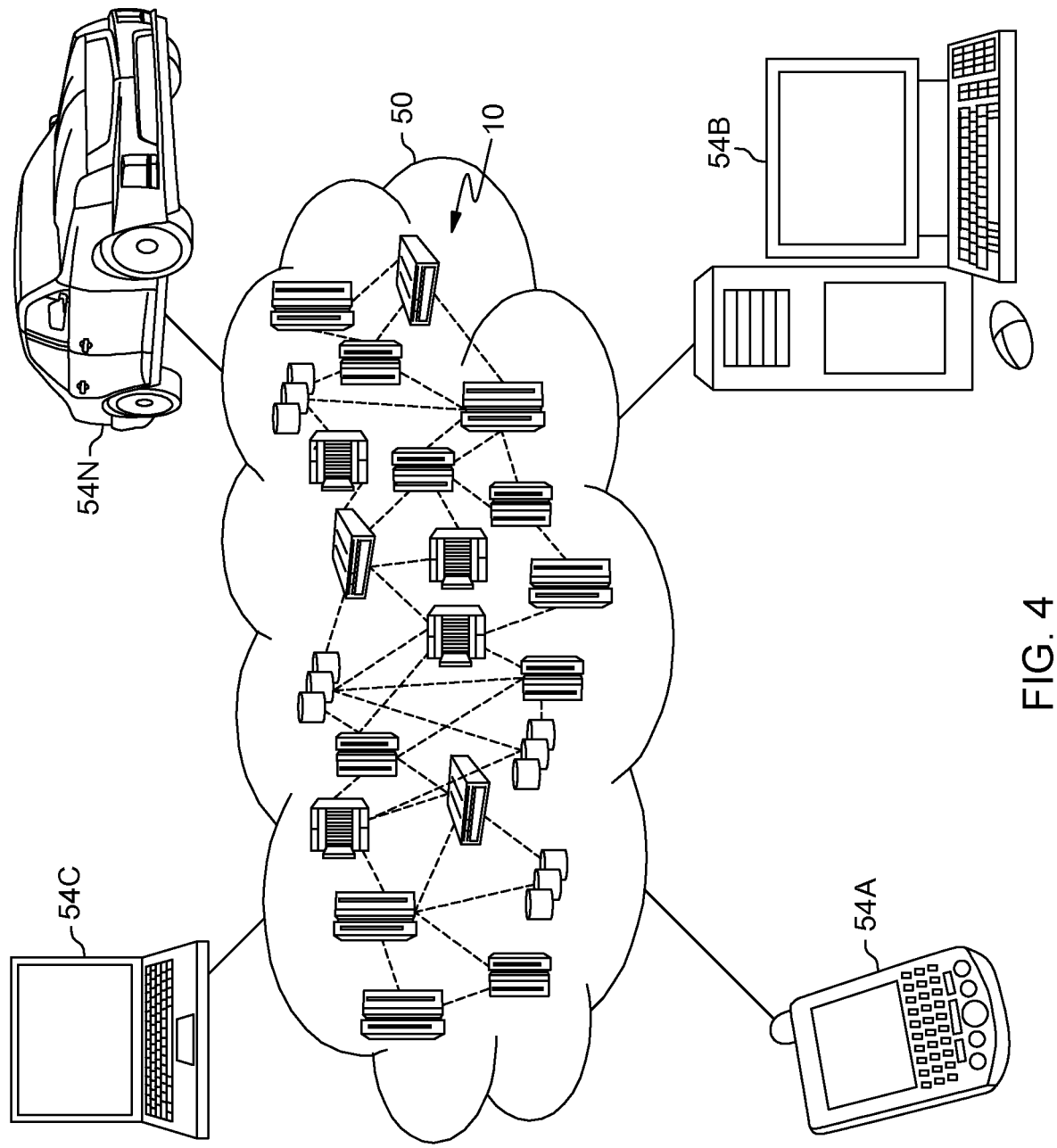
FIG. 4 is a block diagram depicting a cloud computing environment 50 in accordance with at least one embodiment of the present invention.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
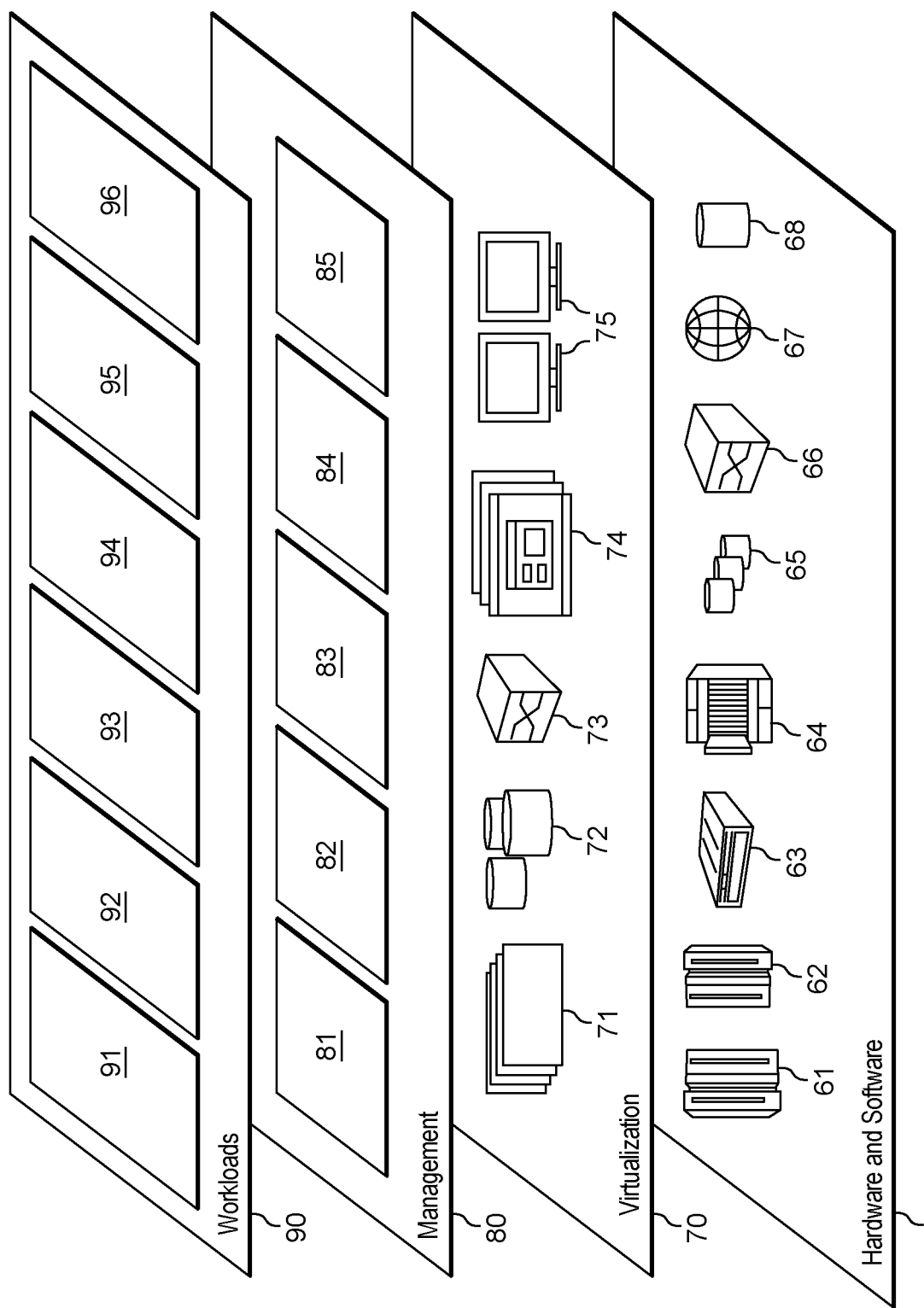
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unknown concept learning 96.

What is claimed is:

1. A computer-implemented method for learning unknown concepts during natural language processing, comprising:

identifying a sentence associated with an unknown concept from a first document;

selecting a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept;

selecting a second sequential set of sentences from a second document, wherein the second sequential set of sentences includes a sentence associated with a known concept, at least one sentence prior to the sentence associated with the known concept, and at least one sentence subsequent to the sentence associated with the known concept;

based on a predetermined sliding window size for the first document and the second document, iteratively comparing concepts associated with the at least one sentence prior to and subsequent to the sentence associated with the unknown concept to concepts associated with at least one sentence prior to and subsequent to the sentence associated with the known concept, respectively;

determining, based on the comparison, whether an inference can be made between the unknown concept associated with the sentence from the first document and the sentence associated with the known concept associated with the sentence from the second document, wherein the inference can be made if an average degree of similarly between a first degree of similarity between the concepts associated with each of the at least one sentence prior to the sentence associated with the unknown concept and the sentence associated with the known concept and a second degree of similarity between the concept associated with each of the at least one sentence subsequent to the sentence associated with the unknown concept and the sentence associated with the known concept are above a predetermined threshold;

iteratively expanding, in response to determining that an inference cannot be made, a window size of the predetermined sliding window until a concept match is found for the unknown concept associated with the sentence from the first document, wherein the window size of the predetermined sliding window is expanded for the first sequential set of sentences to further include at least two sentences prior to and subsequent to the sentence associated with the unknown concept and for the second sequential set of sentences to further include at least two sentences prior to and subsequent the sentence associated with the known concept;

comparing concepts associated with the at least two sentences prior to and subsequent to the sentence associated with the unknown concept to concepts associated with the at least two sentences prior to and subsequent to the sentence associated with the known concept;

determining, based on the comparison, whether an inference can be made between the unknown concept associated with the sentence from the first document and the sentence associated with the known concept associated with the sentence from the second document, wherein the inference can be made if an average degree of similarity between each concept associated with the at least two sentences prior to or at least two sentences subsequent to the unknown concept in the first sequential set of sentences and each concept associated with the at least two sentences prior to or at least two sentences subsequent to the known concept in the second sequential set of sentences is above a threshold; and tagging, in response to determining that an inference can be made, the unknown concept associated with the sentence from the first document with the known concept associated with the sentence from the second document.

2. The computer-implemented method of claim 1, wherein an inference cannot be made if a degree of similarly between the concepts associated with the at least one sentence prior to and subsequent to the sentence in the first set of sequential set of sentences and the concepts associated with the at least one sentence prior to and subsequent to the sentence associated with the known concept in the second set of sequential sentences are below a predetermined threshold.

3. The computer-implemented method of claim 1, wherein an inference can be made if a degree of similarity between the concepts associated with the at least one sentence prior to and subsequent to the sentence in the first set of sequential set of sentences and the concepts associated with the at least one sentence prior to and subsequent to the sentence associated with the known concept in the second set of sequential sentences are above a predetermined threshold.

4. The computer-implemented method of claim 1, further comprising:
  determining a shared concept between the first sequential set of sentences from the first document and the second sequential set of sentences from the second document.

5. The computer-implemented method of claim 1, further comprising:
  reducing, in response to reaching a threshold number of sequential sentences within the first set and the second set of sequential sentences without finding the concept match, the sliding window size to an initial window size and selecting a third document having a similar topic as the first document, the third document being different from the second document; and
  based on the reduced sliding window size for the first document and the third document, repeating the iterative comparison of concepts associated with the at least one sentence prior to and subsequent to the sentence associated with the unknown concept.

6. The computer-implemented method of claim 1, wherein the inference can be made if a total similarity score between a first similarity score between the concept associated with each of the at least one sentence prior to the sentence associated with the unknown concept and the sentence associated with the known concept and a second similarity score between the concept associated with each of the at least one sentence subsequent to the sentence associated with the unknown concept and the sentence associated with the known concept are above a predetermined threshold.

7. A computer program product for learning unknown concepts during natural language processing, the computer program product comprising one or more non-transitory computer readable storage media and program instructions stored on the one or more non-transitory computer readable storage media, the program instructions including instructions to:
  identify a sentence associated with an unknown concept from a first document;
  select a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept;
  select a second sequential set of sentences from a second document, wherein the second sequential set of sentences includes a sentence associated with a known concept, at least one sentence prior to the sentence associated with the known concept, and at least one sentence subsequent to the sentence associated with the known concept;
  based on a predetermined sliding window size for the first document and the second document, iteratively compare concepts associated with the at least one sentence prior to and subsequent to the sentence associated with the unknown concept to concepts associated with at least one sentence prior to and subsequent to the sentence associated with the known concept, respectively;
  determine, based on the comparison, whether an inference can be made between the unknown concept associated with the sentence from the first document and the sentence associated with the known concept associated with the sentence from the second document, wherein the inference can be made if an average degree of similarly between a first degree of similarity between the concepts associated with each of the at least one sentence prior to the sentence associated with the unknown concept and the sentence associated with the known concept and a second degree of similarity between the concept associated with each of the at least one sentence subsequent to the sentence associated with the unknown concept and the sentence associated with the known concept are above a predetermined threshold;

iteratively expand, in response to determining that an inference cannot be made, a window size of the predetermined sliding window until a concept match is found for the unknown concept associated with the sentence from the first document, wherein the window size of the predetermined sliding window is expanded for the first sequential set of sentences to further include at least two sentences prior to and subsequent to the sentence associated with the unknown concept and for the second sequential set of sentences to further include at least two sentences prior to and subsequent the sentence associated with the known concept;

compare concepts associated with the at least two sentences prior to and subsequent to the sentence associated with the unknown concept to concepts associated with the at least two sentences prior to and subsequent to the sentence associated with the known concept;

determine, based on the comparison, whether an inference can be made between the unknown concept associated with the sentence from the first document and the sentence associated with the known concept associated with the sentence from the second document, wherein the inference can be made if an average degree of similarity between each concept associated with the at least two sentences prior to or at least two sentences subsequent to the unknown concept in the first sequential set of sentences and each concept associated with the at least two sentences prior to or at least two sentences subsequent to the known concept in the second sequential set of sentences is above a threshold; and tag, in response to determining that an inference can be made, the unknown concept associated with the sentence from the first document with the known concept associated with the sentence from the second document.

8. The computer program product of claim 7, wherein an inference cannot be made if a degree of similarly between the concepts associated with the at least one sentence prior to and subsequent to the sentence in the first set of sequential set of sentences and the concepts associated with the at least one sentence prior to and subsequent to the sentence associated with the known concept in the second set of sequential sentences are below a predetermined threshold.

9. The computer program product of claim 7, wherein an inference can be made if a degree of similarity between the concepts associated with the at least one sentence prior to and subsequent to the sentence in the first set of sequential set of sentences and the concepts associated with the at least one sentence prior to and subsequent to the sentence associated with the known concept in the second set of sequential sentences are above a predetermined threshold.

10. The computer program product of claim 7, further comprising instructions to:

determine a shared concept between the first sequential set of sentences from the first document and the second sequential set of sentences from the second document.

11. A computer system for learning unknown concepts during natural language processing, comprising:

one or more computer processors;

one or more computer readable storage media; and computer program instructions, the computer program instructions being stored on the one or more computer readable storage media for execution by the one or more computer processors, the computer program instructions including instructions to:

identify a sentence associated with an unknown concept from a first document;

select a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept;

select a second sequential set of sentences from a second document, wherein the second sequential set of sentences includes a sentence associated with a known concept, at least one sentence prior to the sentence associated with the known concept, and at least one sentence subsequent to the sentence associated with the known concept;

based on a predetermined sliding window size for the first document and the second document, iteratively compare concepts associated with the at least one sentence prior to and subsequent to the sentence associated with the unknown concept to concepts associated with at least one sentence prior to and subsequent to the sentence associated with the known concept, respectively;

determine, based on the comparison, whether an inference can be made between the unknown concept associated with the sentence from the first document and the sentence associated with the known concept associated with the sentence from the second document, wherein the inference can be made if an average degree of similarly between a first degree of similarity between the concepts associated with each of the at least one sentence prior to the sentence associated with the unknown concept and the sentence associated with the known concept and a second degree of similarity between the concept associated with each of the at least one sentence subsequent to the sentence associated with the unknown concept and the sentence associated with the known concept are above a predetermined threshold;

iteratively expand, in response to determining that an inference cannot be made, a window size of the predetermined sliding window until a concept match is found for the unknown concept associated with the sentence from the first document, wherein the window size of the predetermined sliding window is expanded for the first sequential set of sentences to further include at least two sentences prior to and subsequent to the sentence associated with the unknown concept and for the second sequential set of sentences to further include at least two sentences prior to and subsequent the sentence associated with the known concept;

compare concepts associated with the at least two sentences prior to and subsequent to the sentence associated with the unknown concept to concepts associated with the at least two sentences prior to and subsequent to the sentence associated with the known concept;

determine, based on the comparison, whether an inference can be made between the unknown concept associated with the sentence from the first document and the sentence associated with the known concept associated with the sentence from the second document, wherein the inference can be made if an average degree of similarity between each concept associated with the at least two sentences prior to or at least two sentences subsequent to the unknown concept in the first sequential set of sentences and each concept associated with the at least two sentences prior to or at least two sentences subsequent to the known concept in the second sequential set of sentences is above a threshold; and tag, in response to determining that an inference can be made, the unknown concept associated with the sentence from the first document with the known concept associated with the sentence from the second document.

12. The computer system of claim 11, wherein an inference cannot be made if a degree of similarly between the concepts associated with the at least one sentence prior to and subsequent to the sentence in the first set of sequential set of sentences and the concepts associated with the at least one sentence prior to and subsequent to the sentence associated with the known concept in the second set of sequential sentences are below a predetermined threshold.

13. The computer system of claim 11, wherein an inference can be made if a degree of similarity between the concepts associated with the at least one sentence prior to and subsequent to the sentence in the first set of sequential set of sentences and the concepts associated with the at least one sentence prior to and subsequent to the sentence associated with the known concept in the second set of sequential sentences are above a predetermined threshold.

14. A computer-implemented method for learning unknown concepts during natural language processing, comprising:
   identifying a sentence associated with an unknown concept from a first document;
   selecting a first sequential set of sentences from the first document, wherein the first sequential set of sentences includes the sentence associated with the unknown concept, at least one sentence prior to the sentence associated with the unknown concept, and at least one sentence subsequent to the sentence associated with the unknown concept;
   selecting a second sequential set of sentences from a second document, wherein the second sequential set of sentences includes a sentence associated with a known concept, at least one sentence prior to the sentence associated with the known concept, and at least one sentence subsequent to the sentence associated with the known concept;
   based on a predetermined sliding window size for the first document and the second document, iteratively comparing concepts associated with the at least one sentence prior to and subsequent to the sentence associated with the unknown concept to concepts associated with at least one sentence prior to and subsequent to the sentence associated with the known concept, respectively;
   determining, based on the comparison, whether an inference can be made between the unknown concept associated with the sentence from the first document and the sentence associated with the known concept associated with the sentence from the second document, wherein the inference can be made if a total similarity score between a first similarity score between the concept associated with each of the at least one sentence prior to the sentence associated with the unknown concept and the sentence associated with the known concept and a second similarity score between the concept associated with each of the at least one sentence subsequent to the sentence associated with the unknown concept and the sentence associated with the known concept are above a predetermined threshold;
   iteratively expanding, in response to determining that an inference cannot be made, a window size of the predetermined sliding window until a concept match is found for the unknown concept associated with the sentence from the first document, wherein the window size of the predetermined sliding window is expanded for the first sequential set of sentences to further include at least two sentences prior to and subsequent to the sentence associated with the unknown concept and for the second sequential set of sentences to further include at least two sentences prior to and subsequent the sentence associated with the known concept;
   comparing concepts associated with the at least two sentences prior to and subsequent to the sentence associated with the unknown concept to concepts associated with the at least two sentences prior to and subsequent to the sentence associated with the known concept;
   determining, based on the comparison, whether an inference can be made between the unknown concept associated with the sentence from the first document and the sentence associated with the known concept associated with the sentence from the second document, wherein the inference can be made if an average degree of similarity between each concept associated with the at least two sentences prior to or at least two sentences subsequent to the unknown concept in the first sequential set of sentences and each concept associated with the at least two sentences prior to or at least two sentences subsequent to the known concept in the second sequential set of sentences is above a threshold; and
   tagging, in response to determining that an inference can be made, the unknown concept associated with the sentence from the first document with the known concept associated with the sentence from the second document.

15. The computer-implemented method of claim 14, wherein an inference cannot be made if a degree of similarly between the concepts associated with the at least one sentence prior to and subsequent to the sentence in the first set of sequential set of sentences and the concepts associated with the at least one sentence prior to and subsequent to the sentence associated with the known concept in the second set of sequential sentences are below a predetermined threshold.

16. The computer-implemented method of claim 14, wherein an inference can be made if a degree of similarity between the concepts associated with the at least one sentence prior to and subsequent to the sentence in the first set of sequential set of sentences and the concepts associated with the at least one sentence prior to and subsequent to the sentence associated with the known concept in the second set of sequential sentences are above a predetermined threshold.

17. The computer-implemented method of claim 14, further comprising:
    determining a shared concept between the first sequential set of sentences from the first document and the second sequential set of sentences from the second document.

* * * * *